(12) United States Patent
Jain et al.

(10) Patent No.: US 7,633,898 B2
(45) Date of Patent: Dec. 15, 2009

(54) MOBILE IP ADDRESSING

(75) Inventors: Nikhil Jain, Mendham, NJ (US); Gavin Bernard Horn, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 564 days.

(21) Appl. No.: 11/347,506

(22) Filed: Feb. 2, 2006

(65) Prior Publication Data
US 2007/0177559 A1    Aug. 2, 2007

(51) Int. Cl.
*H04Q 7/00* (2006.01)
(52) U.S. Cl. .................. 370/328; 370/338; 370/389; 455/439; 455/436
(58) Field of Classification Search .......... 370/328, 370/338, 389; 455/436, 439
See application file for complete search history.

(56) References Cited
U.S. PATENT DOCUMENTS

2006/0034209 A1* 2/2006 O'Neill ............. 370/328
2006/0062214 A1* 3/2006 Ng et al. ............. 370/389
2007/0047508 A1* 3/2007 Yamada et al. ........ 370/338
2007/0087748 A1* 4/2007 Du et al. ............. 455/436

* cited by examiner

*Primary Examiner*—Danh C Le
(74) *Attorney, Agent, or Firm*—Albert J. Harnois; Florin Corie

(57) ABSTRACT

A system and method are provided for mobile Internet Protocol (IP) addressing, in a multi-mode wireless communications access terminal (AT). The method provides an AT with an IP address (ATA), and a care-of-address (CoA) in each of a plurality of networks. In one aspect, the AT selects a first network for transmission, from the plurality of networks. The AT sends an IP packet to a correspondent node (CN) via a first mobile node (MN) external device. Regardless of the network selected, the AT is able to use the ATA as a source address. Sending the IP packet to the CN may include creating a tunnel between the first MN and the HA. The IP packet is sent to the HA using the first CoA as a tunnel source address, and the HA sends the IP packet to the CN using the ATA as the source address.

37 Claims, 11 Drawing Sheets

MOBILE IP ADDRESSING

FIELD

The present invention generally relates to wireless communications and, more particularly, to a mobile Internet Protocol (IP) system and method for addressing a wireless transponder access terminal (AT).

BACKGROUND

Traffic on the Internet is growing exponentially due to an increasing number of subscribers and the introduction of new applications. Wide area wireless networks are also experiencing rapid subscriber growth. Currently, there are many efforts underway to provide data services on wireless access networks.

To facilitate data services in mobile wireless telecommunication systems, it is desirable to allow mobile wireless nodes to change their link-layer point of network attachment without reassigning a new network address. According to current data network telecommunication standards for mobile equipment in general (e.g., the "Mobile IP" standards promulgated by the Internet Engineering Task Force (IETF) or the General Packet Radio Service (GPRS) standards proposed by the European Telecommunication Standards Institute (ETSI)), one way to provide the desired network address transparency is to employ "mobility agents." These are network routing nodes that route communication content on behalf of mobile nodes as they move around the network. For example, according to the IETF Mobile IP standards, a mobile node's mobility agents may consist of a "home agent" routing node and may also include a "foreign agent" routing node. The home agent is a routing node in the mobile node's sub-network that maintains a network interface on the link indicated by the mobile node's "home address," which is a network address intended to remain assigned to the mobile node for an extended time period. When the mobile node is away from its home sub-network, the home agent intercepts communication content bound for the mobile node's home address and tunnels it for delivery to a "care-of-address" assigned to the mobile node, when the mobile node registers on a foreign sub-network. The care-of address may be the address of a foreign agent routing node in the foreign sub-network.

Correspondent nodes wishing to communicate with a foreign-registered mobile node are able to address their communication content to the mobile node's home address. Transparently, the communication content is tunneled to the mobile node's care-of-address and delivered to the mobile node on the foreign sub-network. Normal routing may be used for sending return communication content from the mobile node to the correspondent node.

The above-mentioned routing mechanism can be used for mobile wireless nodes connected to a foreign sub-network via an air interface. However, a problem may arise if the mobile wireless node is being actively transported while communicating over the data network, and a call handoff is required from one radio base station to another. In that case, the old base station may be linked to one care-of-address, while the new base station is linked to another care-of-address. Call handoff then requires that the communication tunneling endpoint be transferred from the old care-of-address to the new care-of-address.

Further, in some cellular telephony architectures a care-of-address endpoint located in the core network is utilized as the addressed communication, e.g. target Internet Protocol Address, for data communication with a wireless communication apparatus or terminal. In some instances, the endpoint may be a packet data service node (PDSN), a base station controller (BSC), or the like. A handoff between PDSN endpoints may be required to maintain a minimum level of communications with the mobile wireless node, for instance due to conditions in the core network such as congestion or latency to the mobile wireless node. A PDSN handoff then requires that the communication tunneling endpoint be transferred from the care-of-address of the old PDSN, to the care-of-address of the new PDSN.

Transferring the tunneling endpoint of the care-of-address may create gaps that interrupt the timely delivery of call content, or result in out-of-order delivery of content, both of which can degrade communication quality, particularly for voice telephony. Such gaps arise from the inability of the data network to coordinate well with the air interface so as to determine the exact time of handoff. Delays can occur between the point of handoff and the point at which the home agent begins routing communication content to the new care-of-address.

It would be advantageous if a telecommunication system serving mobile wireless access terminals could provide improved call handoff without loss of communication content. It would also be advantageous if the tunneling endpoint care-of address could be maintaining without transfers or handoffs.

SUMMARY

Multi-mode wireless communications access terminals (ATs), devices capable of communicating in different types of networks, are becoming more common. For example, an AT may be capable of communicating in both an IEEE 802.11 network and a CDMA cellular network. Conventionally, such an AT has a different IP address for each network. Network handoffs are complicated by the fact that the networks have different geographic coverage areas and quality of service (QoS) capabilities. Further, although different networks may all be connected to the Internet, communications between networks is still an evolving issue.

The instant invention uses a home agent (HA) to manage session continuity for multi-mode AT communications, where each mode is associated with a different network. The HA cross-references an AT's mobile IP (MIP) address with a care-of-address (CoA) in each network. Thus, the HA is able to direct IP packets via a particular network on a packet-by-packet basis, or send duplicate packets via multiple networks for improved reliability.

Accordingly, a method is provided for mobile IP addressing, in a multi-mode wireless communications AT. The method provides an AT with an IP address (ATA), and a CoA in each of a plurality of networks. In one aspect, the AT selects a first network for transmission, from the plurality of networks. The AT sends an IP packet to a correspondent node (CN) via a first mobile node (MN) external device, and regardless of the network selected, the AT is able to use the ATA as the source address in the packet header.

Sending the IP packet to the CN may include creating a tunnel between the MN and the HA. The IP packet is sent to the HA using the first CoA as a tunnel source address, and the HA removes the tunnel header information and sends the IP packet to the CN with the ATA as the source address.

In another aspect, the AT receives an IP packet from the CN with the ATA listed as a destination address, via a MN external device. Again, the ATA can be used as the destination address in the IP packet header, regardless of the network selected. More particularly, receiving an IP packet from the CN may include the CN sending the IP packet to the HA, and the creation of a tunnel between the HA and the MN. For example, the IP packet can be sent to the first MN with a first CoA listed as a tunnel destination address, and the first MN can remove the tunnel header information and send the IP packet to the AT, with the ATA listed as the destination address.

Additional details of the above-described method, and a multi-mode wireless AT system for sending IP packets through the use of MIP addressing are described below.

BRIEF DESCRIPTION OF THE DRAWINGS

FIG. 6 is a diagram depicting the digital wrapper used for transporting an IP packet from the CN to the AT.

FIG. 9 is a flowchart illustrating a method for MIP addressing in a multi-mode wireless communications access AT.

FIG. 10 is a flowchart illustrating a variation in the method for MIP addressing in a multi-mode wireless communications AT.

DETAILED DESCRIPTION

Figure 1:
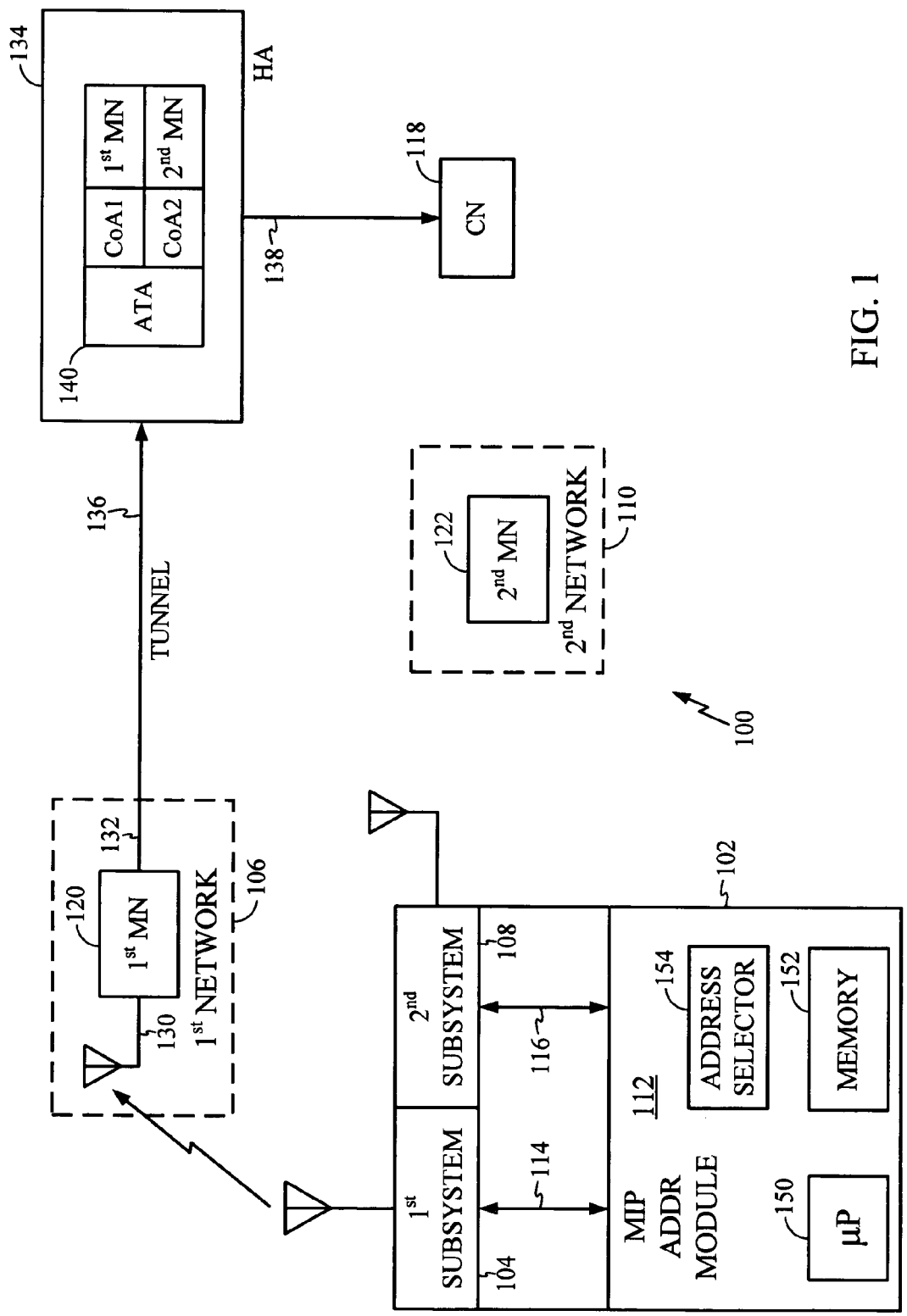
FIG. 1 is a schematic block diagram of a multi-mode wireless communications access terminal (AT) system for sending Internet Protocol (IP) packets using mobile IP (MIP) addressing.

FIG. 1 is a schematic block diagram of a multi-mode wireless communications access terminal (AT) system for sending Internet Protocol (IP) packets using mobile IP (MIP) addressing. The system 100 comprises an AT 102. The access terminal may be referred to by those skilled in the art as a handset, a wireless communications device, user terminal, user equipment, mobile station, mobile unit, subscriber station, subscriber unit, mobile radio, radio telephone, wireless station, wireless device, or some other terminology. The various concepts described throughout this disclosure are intended to apply all wireless communication devices regardless of their specific nomenclature. Since the AT is multi-mode, it includes a plurality of communication subsystems having wireless transceivers for communicating with external device mobile units (MNs) in a corresponding plurality of networks. A first subsystem 104, for communicating with a first network 106, and a second subsystem 108, for communicating with a second network 110, are shown. However, it should be understood that the AT 102 is not limited to any particular number of subsystems. For example, the subsystems may be capable of communicating with Ethernet, Bluetooth, IEEE 802.11, IEEE 802.15, Code Division Multiple Access (CDMA) telephone, or Global System for Mobile communications (GSM) telephone networks, to name a few possible examples. The AT 102 is not limited to any particular type of wireless communications, and in some aspects, wired communications are supported.

A MIP addressing module 112 has communication subsystem interfaces 114 and 116, connected to subsystems 104 and 108, respectively. The MIP addressing module 112 has an AT IP address (ATA) that is cross-referenced to a care-of-address (CoA) for each of the plurality of MNs. As shown, the MIP addressing module 112 selects the first network 106 for transmission, and sends an IP packet to a correspondent node (CN) 118. As explained below, the MIP addressing module send the IP packet via a first MN 120, using the ATA as the source address.

Alternately, the MIP addressing module 112 may be understood to be a processing device, which can be enabled with a microprocessor 150 and microprocessor executable instructions stored in memory 152. In some aspects, some or all of the processor steps can be enabled using a state machine or electronic circuitry. In this case, the processing device 112 comprises interfaces 114 and 116 for a plurality of communication subsystems 104/108 wirelessly communicating with external device MNs 120/122 in a corresponding plurality of networks 106/110. The memory 152 stores the AT ATA. A network address selector 154 sends IP packets to CN 118 using the ATA as the source address, via the first MN 120 with the first CoA (FIG. 1), the second MN 122 with the second CoA (FIG. 2), or a combination of the two MNs (FIG. 3).

Figure 2:
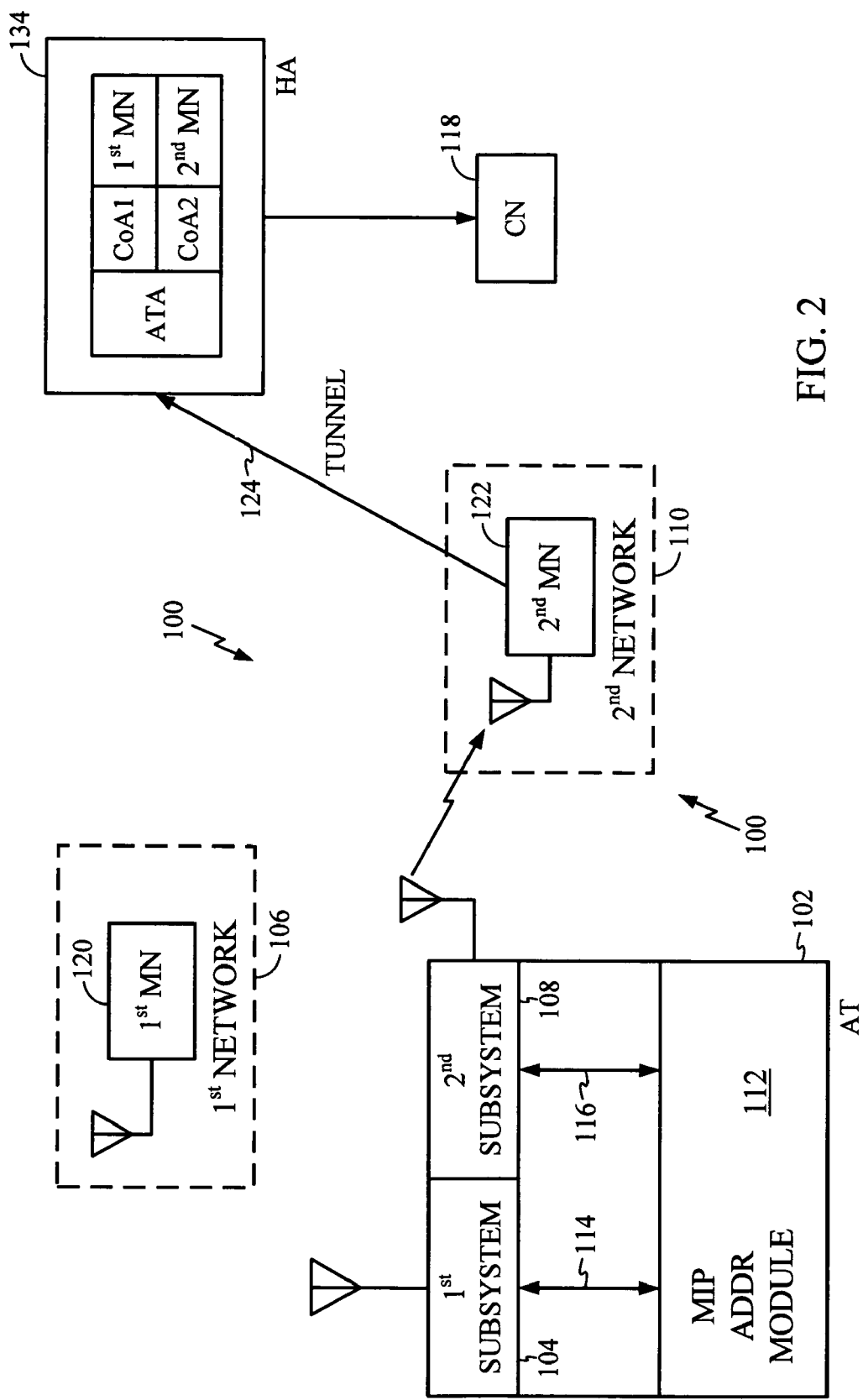
FIG. 2 is a schematic block diagram featuring a first variation of the AT MIP addressing system of FIG. 1.

FIG. 2 is a schematic block diagram featuring a first variation of the AT MIP addressing system of FIG. 1. As shown, the AT MIP addressing module 112 selects the second subsystem for transmission 108, and sends an IP packet to the CN 118. The packet is sent via a second MN 122 in the second network 110, via interface 124, using the ATA as the source address.

Figure 3:
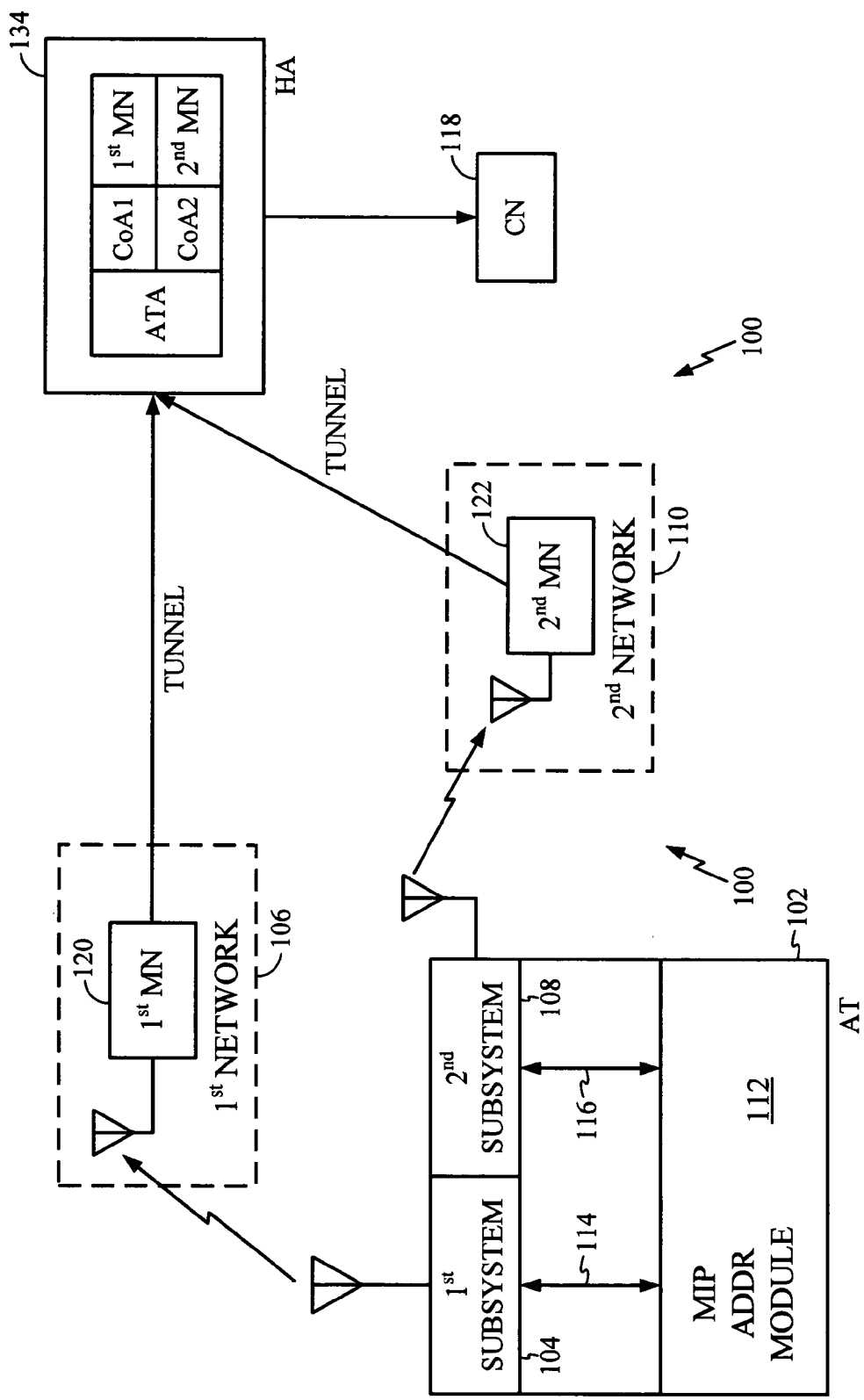
FIG. 3 is a schematic block diagram featuring a second variation of the AT MIP addressing system of FIG. 1.
Figure 4:
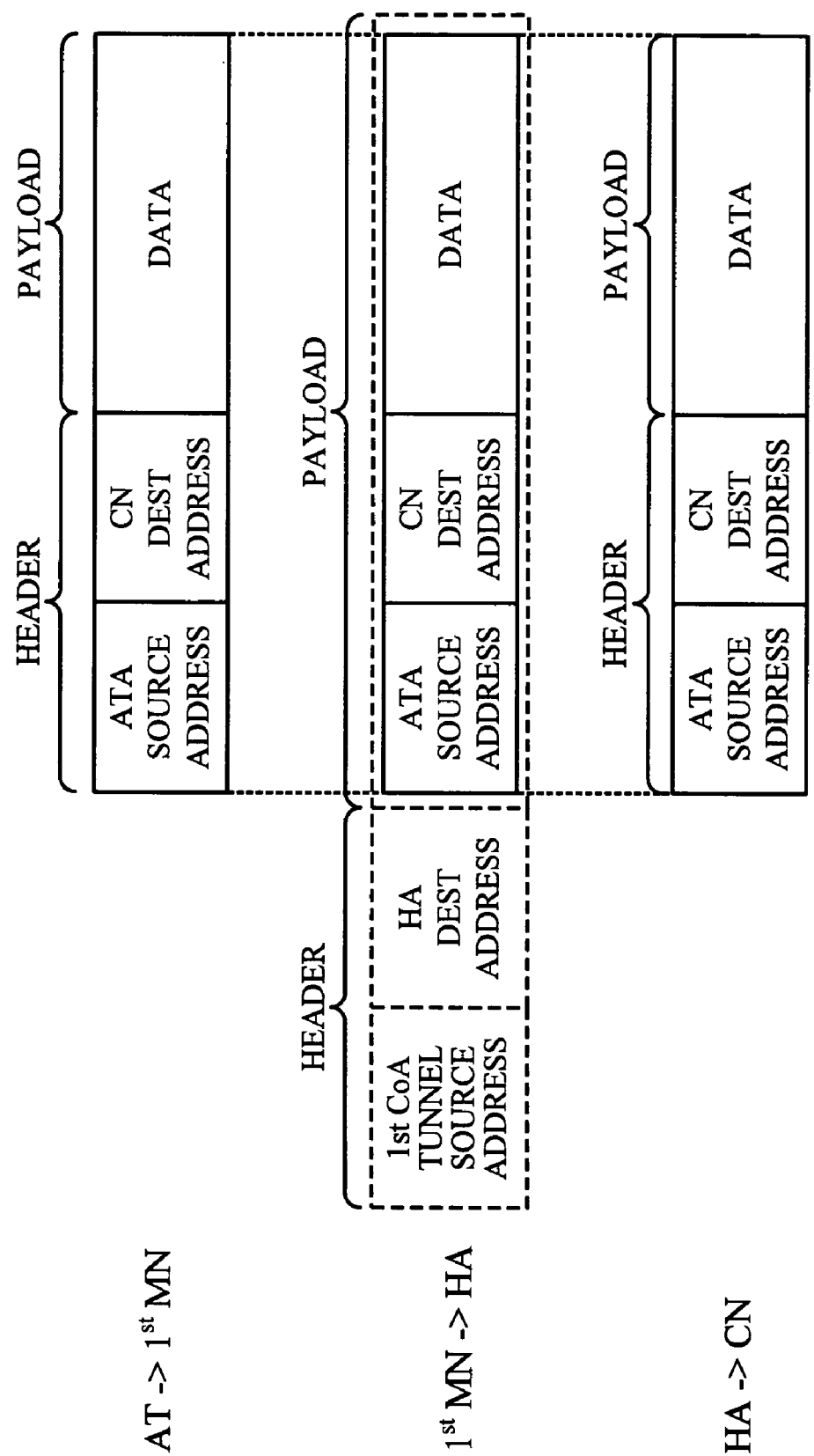
FIG. 4 is a diagram depicting the digital wrapper used for transporting an IP packet from the AT to the CN.

FIG. 3 is a schematic block diagram featuring a second variation of the AT MIP addressing system of FIG. 1. Here, the AT MIP addressing module 112 selects the second subsystem 108 for transmission, in addition to the first subsystem 104. The MIP addressing module 112 sends IP packets to the CN 118 using the ATA as the destination address. The packets are sent via the first MN 120 associated with the first network 106, and via the second MN 122 associated with a second network 110. FIG. 4 is a diagram depicting the digital wrapper used for transporting an IP packet from the AT 102 to the CN 118. Viewing both FIGS. 1 and 4, the first MN 120 has a first network interface 130 (represented as an antenna) for receiving the IP packet from the AT 102 with the ATA listed as the source address. The first MN 120 has a tunnel interface 132 for sending the IP packet, using a first CoA as the tunnel source address. A home agent (HA) 134 has a tunnel interface 136 for receiving the IP packet from the first MN 120. The HA 134 has a network interface 138 to sending the IP packet to the CN 118, with the ATA listed as the source address. It should be understood that although the interface 130 and the first MN 120 are shown as a common device, they need not necessarily be co-located. In other aspects not shown, data can be communicated from the air interface 130 to the first MN 120 through a communication link. Further, the interface 136 from the first MN and the interface 124 from the second MN 122 (see FIG. 2) may be the same interface. Likewise, the HA to CN interface 138 may also be the same, regardless of whether the first or second network is used.

As shown, the HA 134 includes a memory 140 where the AT's ATA is cross-referenced to each CoA. CoA1 is shown associated with the first MN 120 in the first network 106. CoA2 is shown associated with the second MN 122 in the second network 110. The CoAs may be registered in the HA 134 by the AT 102, the MN (either first MN 102 or second MN 122), or a combination of the AT 102 and the MN(s).

Figure 5:
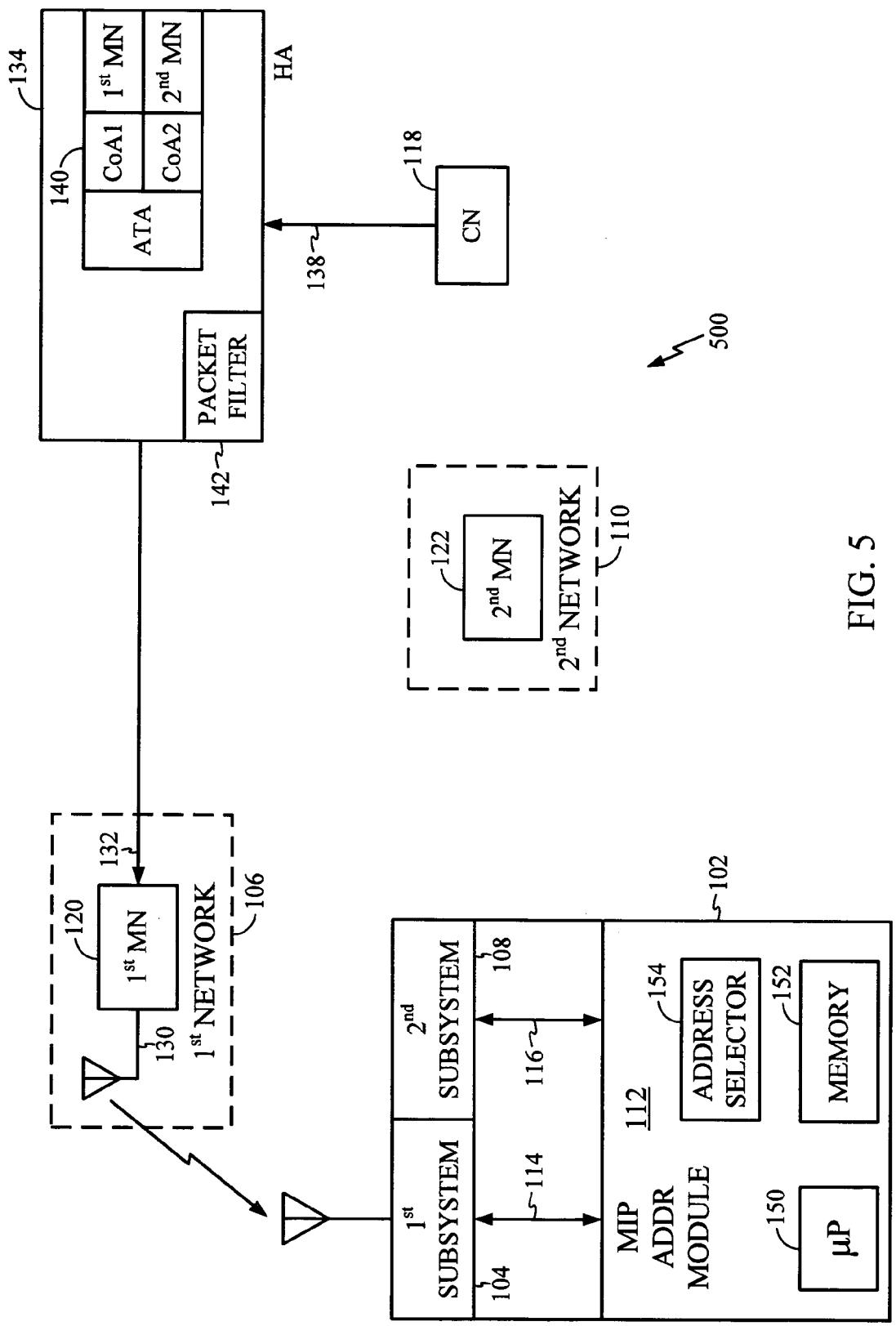
FIG. 5 is a schematic block diagram of a multi-mode wireless communications AT system for receiving IP packets using MIP addressing.

FIG. 5 is a schematic block diagram of a multi-mode wireless communications AT system for receiving IP packets using MIP addressing. The system 500 comprises AT 102, with the first communication subsystem 104 and the second communication subsystem 108, as shown in FIG. 1. Again, the MIP addressing module 112 has communication subsystem interfaces and an AT ATA cross-referenced to CoAs for the first MN external device 120 and the second MN external device 122. The MIP addressing module 112 receives an IP packet from the CN 118, via the first MN 120. The IP packet lists the ATA as the destination address, via the first MN 120.

As explained in the description of FIG. 1, the MIP addressing module 112 may be understood as a microprocessor 150, memory 152, and MIP addressing section 154. As explained above, the MIP addressing module 112 comprises interfaces 114 and 116 for a plurality of communication subsystems 104/108 wirelessly communicating with external device MNs 120/122 in a corresponding plurality of networks 106/110. The memory 152 stores the AT ATA. In this aspect, the network address selector 154 receives IP packets from CN 118 with the ATA listed as the destination address, via the first MN 120, the second MN 122, or both MNs.

Figure 11:
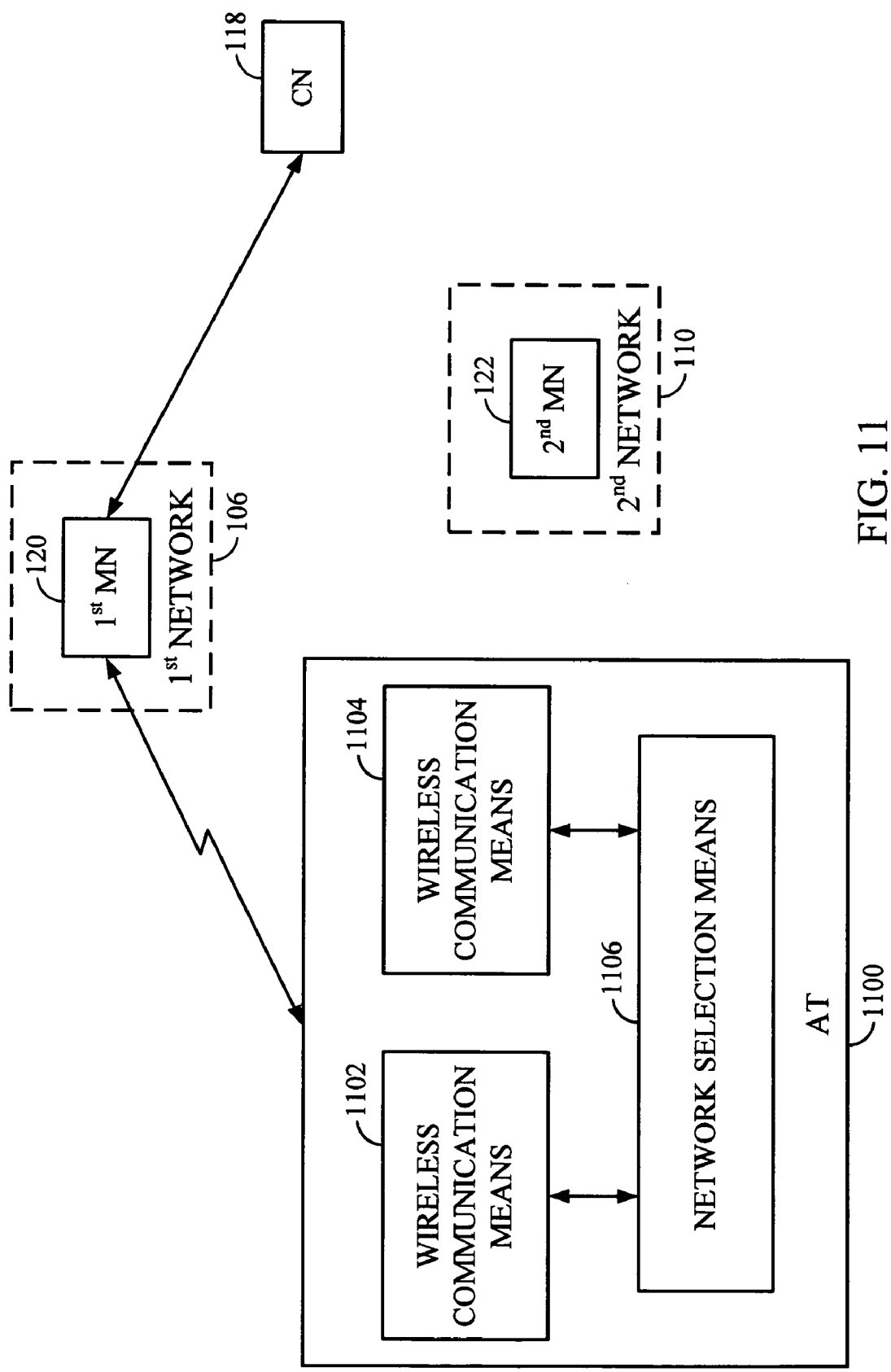
FIG. 11 is a schematic block diagram featuring a third variation of the multi-mode wireless communications AT of FIG. 1.

FIG. 11 is a schematic block diagram featuring a third variation of the multi-mode wireless communications AT of FIG. 1. The AT 1100 includes means for wirelessly communicating with external device mobile units (MNs) in a plurality of networks. Two wireless communication means 1102 and 1104 are shown, however, the AT is not limited to any particular number. Also shown is a means for network selection 1106. The network selection means 1106 has an AT IP address (ATA) cross-referenced to a care-of-address (CoA) for each of the plurality of MNs. MNs 120 and 122 are shown. The network selection means 1106 selects a first network for transmission (i.e., network 106), and sends an IP packet to CN 118 using the ATA as the source address, via the first MN 120. In another aspect, the network selection means 1106 receives an IP packet from the CN 118 with the ATA listed as the destination address, via the first MN 120.

Figure 6:
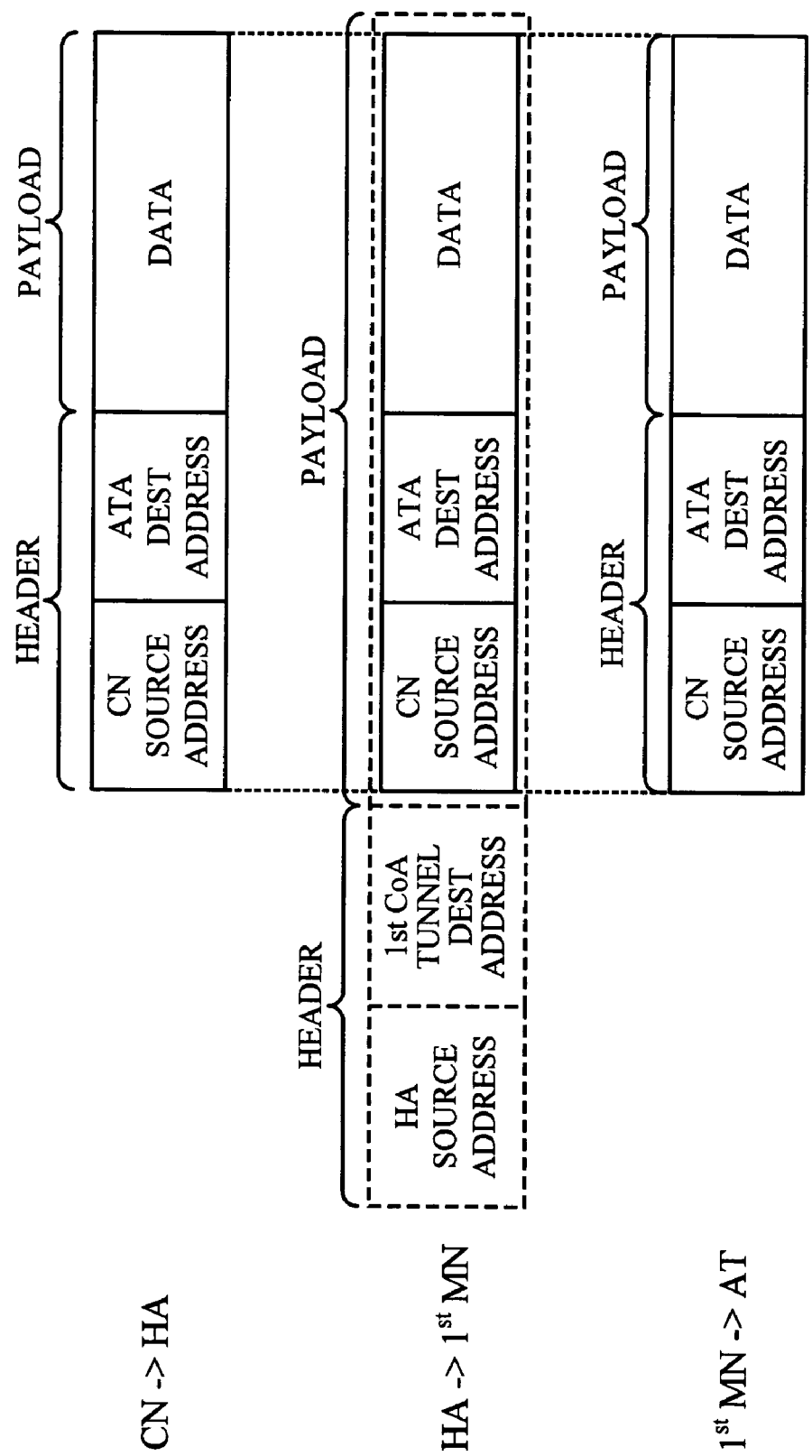

FIG. 6 is a diagram depicting the digital wrapper used for transporting an IP packet from the CN 118 to the AT 102. Viewing both FIGS. 5 and 6, the HA 134 has a network interface 138 for receiving the IP packet from the CN 118, with the ATA listed as the destination address. The HA 134 has a tunnel interface 136 for sending the IP packet with the first CoA listed as the tunnel destination address. The first MN 120 has a tunnel interface 132 for receiving the IP packet, and a network interface 130 for sending the IP packet to the AT 102. The first MN 120 sends the IP packet to the AT 102 with the ATA listed as the destination address.

The network that is used for sending the IP packet to the AT 102 may be configured by a number of different elements, including the AT 102, the HA 134, the first MN 120 (or second MN 122), or a combination of the AT, HA and MN(s). If the HA 134 makes the selection, a packet filter 142 may be configured to use selection criteria such as the source address, destination address, source port, destination port, type of service, protocol type, packet size, traffic class, or flow label. Other criteria, well known by those skilled in the art, could also be used in the design of the packet filter 142.

Although not specifically shown in FIGS. 5 and 6, in other aspects of the system, IP packets can be sent from the CN 118, to the AT 102, using the second network 110, or both the first and second networks. It should also be understood that although only two networks, and two corresponding AT communication subsystems are shown, the system 500 is not limited to any particular number of networks or AT communication subsystems.

Functional Description

In IP networks, routing is based on stationary IP addresses, just as a postal letter is delivered to the fixed address on the envelope. A device on a network is reachable through normal IP routing, using a network-assigned IP address. This fixed-address scheme begins to break down when a device roams away from its home network and is no longer reachable using normal IP routing, which may result in an active session being terminated. Mobile IP was created to enable users to keep the same IP address, while traveling to a different network carrier, or using a different technology, to ensure that sessions or connections are not dropped.

Because the mobility functions of Mobile IP have been conventionally performed at the network layer, rather than at the physical layer, the AT can span different types of wireless and wireline networks while maintaining connections and ongoing applications. Remote login, remote printing, and file transfers are some examples of applications where it is undesirable to interrupt communications while an individual roams across network boundaries. Also, certain network services, such as software licenses and access privileges, are based on IP addresses. Changing these IP addresses can compromise the network services.

Figure 7:
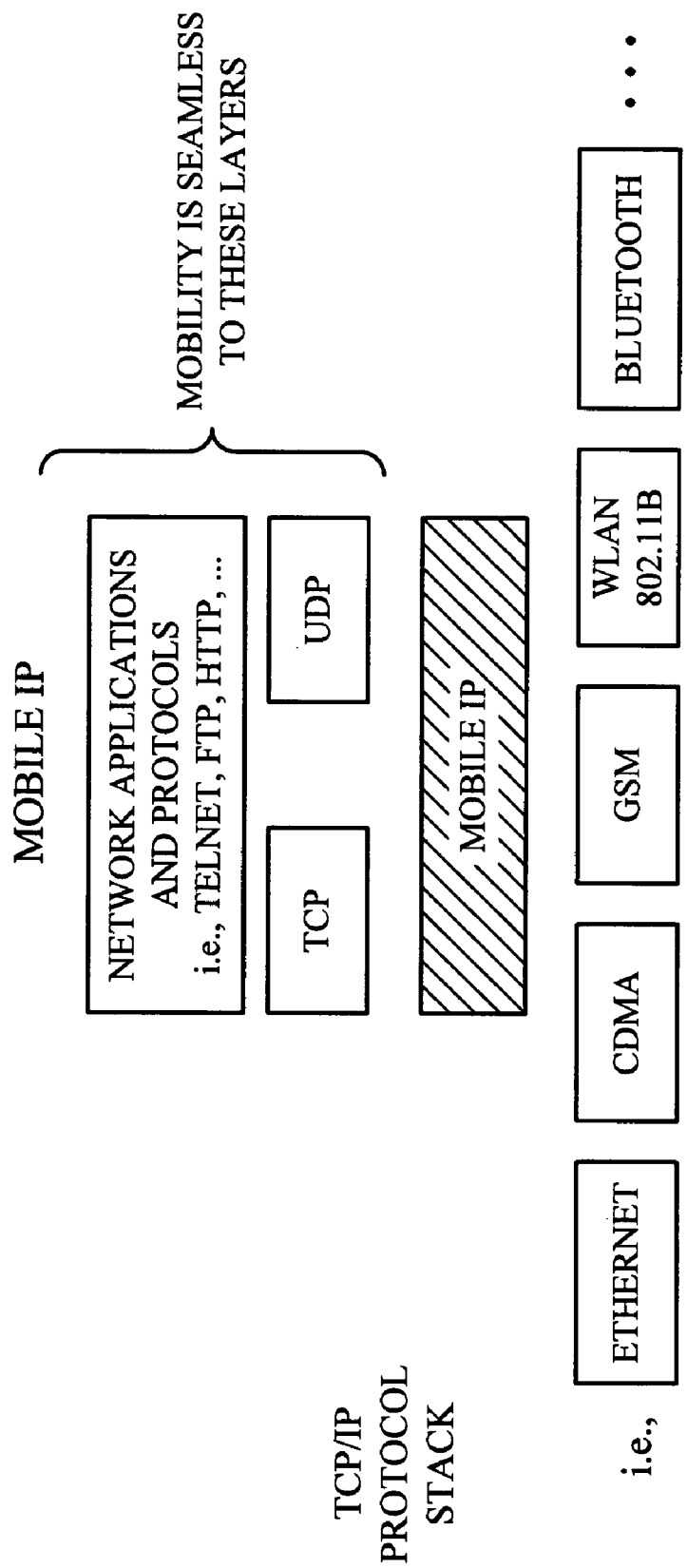
FIG. 7 is a diagram depicting TCP/IP protocol stack, as modified for use with the present invention MIP addressing system.

FIG. 7 is a diagram depicting TCP/IP protocol stack, as modified for use with the present invention MIP addressing system. Conventionally, mobile stations (i.e., WLAN devices) have been dependent upon Physical Media. For example, an IEEE 802.11b device must undergo a re-association procedure when it acquires a new access point (AP). As mentioned above, the Internet assumes the use of static device locations and addresses. As a result, when a conventional mobile device reconnects in a new location, a new IP address must be obtained. Further, a new default router address and DNS server address must be obtained. If the mobile station is a computer, a change in IP address usually requires that the network interface for the device be restarted. Typically, any previously running applications using the network interface are likely to stop working properly.

Conventional IP addresses are used for two purposes: host identification and routing. With respect to the identification of a host, the TCP/IP stack typically identifies the source IP address as the endpoint. These addresses correspond to specific locations on the Internet. MIP is a solution that is independent of the Physical and data layers. MIP addressing creates a location-independent identifier for an AT, while creating a new type of location-dependent address. A permanent IP address, also referred to herein as a home address or ATA is used to identify the AT. Another address, which may change depending upon the location of the AT, referred to herein as the CoA, is used for routing.

As described in the explanation of FIGS. 1 through 6, a mobile node (MN) can be thought of as a device that maintains an immediate link with the AT, even if the AT is roaming. However, it should be understood that a roaming AT may acquire different MNs as it roams through a network. Acquiring a new MN may require that the AT obtain a new CoA. The AT communicates with a MN in each network, and the CoA can be thought of as the intermediary address between the HA and AT. Unlike conventional MIP, the MN of the present invention system is also located in a device external to the AT. In one aspect, there is a separate MN for each network interface used by the AT.

The Home Agent is a router, typically located in the AT's home network, which serves as the anchor point for communication with the MN. The HA tunnels packets from a CN device on the Internet, to the MN. Conventionally, a foreign agent is a router that may function as the point of attachment for the Mobile Node when it roams to a foreign network, delivering packets from the Home Agent to the Mobile Node. However, since the MN of the present invention system is external to the AT, and therefore, not necessarily roaming, the functions previously associated with the foreign agent are performed by the MN in the present invention.

The care-of-address is the termination point of the tunnel in the Mobile Node. The Home Agent maintains an association between the AT's ATA and its care-of address, which is the address of the Mobile Node communicating with the AT. The AT is able to send and receive packets using its home IP address, effectively maintaining the appearance that it is always on its home network. Even when the AT is roaming in foreign networks, its movements are transparent to correspondent nodes.

The systems described in FIGS. 1 through 6 may be arranged to support an arrangement of networks, where the AT is able to communicate in different networks having complementary strengths. For example, the AT may be registered with an HA for a number of networks, to receive data simultaneously over multiple radio access technologies (RAT), for the purpose of redundancy. Alternately, the AT may use one network (i.e., a cellular network) for paging, and a different network (i.e., a wireless LAN) for packet forwarding. In one aspect, the HA manages the use of networks using a predetermined policy. In a different aspect, the AT uses messaging to manage network use, and to configure the HA and MN devices. Further, the HA may also be configured to dynamically update how and where packets are sent, based on data traffic received from the AT. For example, paging through a first network may occur as a result of data packets being received at the HA.

The AT may be configured for listening to only a first network for paging. When a page is received, the AT may access the network on which it was paged, access another network, or access multiple networks simultaneously (for redundancy). The HA may be configured differently, based on AT capabilities and policy, to support each mode of access.

With respect to handoffs, the HA may be configured to forward a packet to multiple RAT networks. A multi-mode AT may simultaneously download from two RAT networks during handoff. The AT may switch to a destination network, once the same packet is received from both networks, or it may switch when it receives a message from the HA in the data stream.

Figure 8:
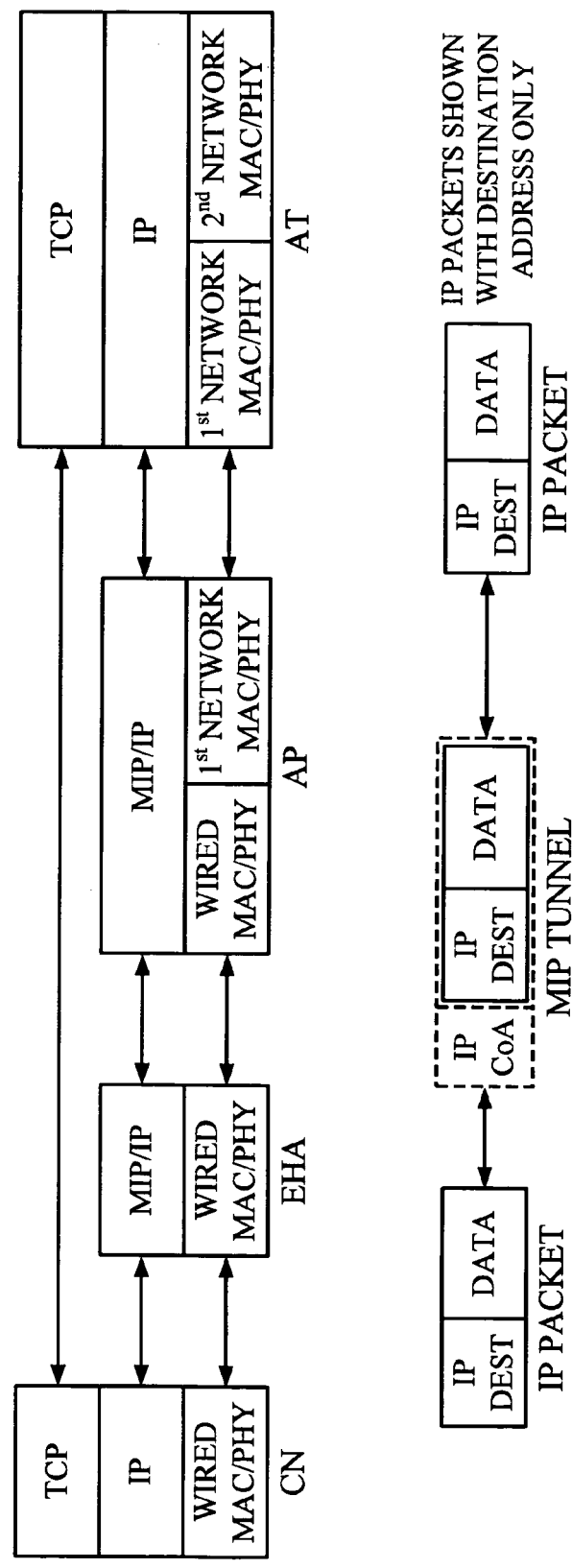
FIG. 8 is a diagram depicting a variation of the MIP addressing protocol stack of FIG. 7.

FIG. 8 is a diagram depicting a variation of the MIP addressing protocol stack of FIG. 7. In this figure, a mobile node (MN) is located at the AP. A MIP tunnel is created between the HA and the AP (MN) in the first network. Although not specifically shown, the second network has an equivalent protocol stack, with the AT using the second network MAC/PHY access layers.

With respect to registration, different filter sets can be defined for an AT, with a destination CoA associated with each filter. That is, a different packet forwarding policy can be configured for each filter. With respect to forwarding, MIP can be used to manage the forwarding of packet flows during a connection. In another aspect, a packet flow's behavior may be dynamically updated based on data traffic received from the AT.

Figure 9:
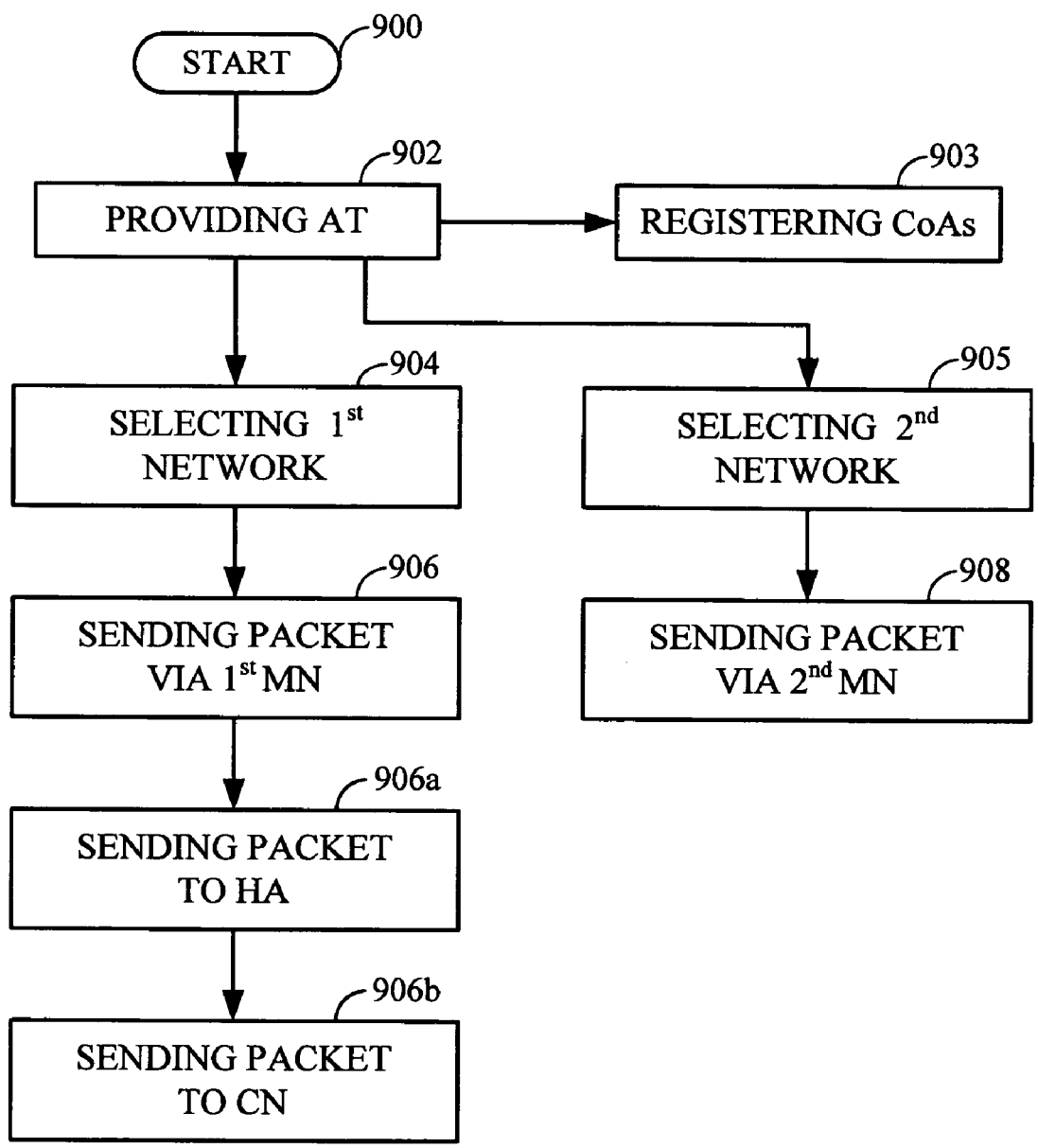

FIG. 9 is a flowchart illustrating a method for MIP addressing in a multi-mode wireless communications access AT. In combination with FIG. 5, the flowchart may represent a signal bearing medium tangibly embodying a program of machine-readable instructions executable by a digital processing apparatus to perform operations for MIP addressing in a multi-mode wireless communications AT. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 900.

Step 902 provides an AT having an IP address (ATA) and a CoA in each of a plurality of networks, see the explanation of FIG. 1 above. Step 904 selects a first network for transmission from the plurality of networks. Step 906 sends an IP packet to a CN via a first MN external device, using the ATA as a source address.

Alternately, Step 905 selects a second network for transmission, and Step 908 sends an IP packet to the CN via a second MN external device using the ATA as the source address. In another aspect, Steps 904 and 905 are both preformed. That is, the second network is selected for transmission, in addition to the first network. Then, Step 906 and 908 are both performed.

In a different aspect, Step 902 includes creating a tunnel between the first MN and the HA, and sending the IP packet to the CN in Step 906 (or Step 908) includes substeps. Step 906a sends the IP packet to the HA using the first CoA as a tunnel source address. Step 906b sends the IP packet from the HA to the CN using the ATA as the source address.

In one aspect Step 903 registers the CoAs with the HA, from a source such as the AT, the MN(s), or a combination of the AT and the MN(s).

Figure 10:
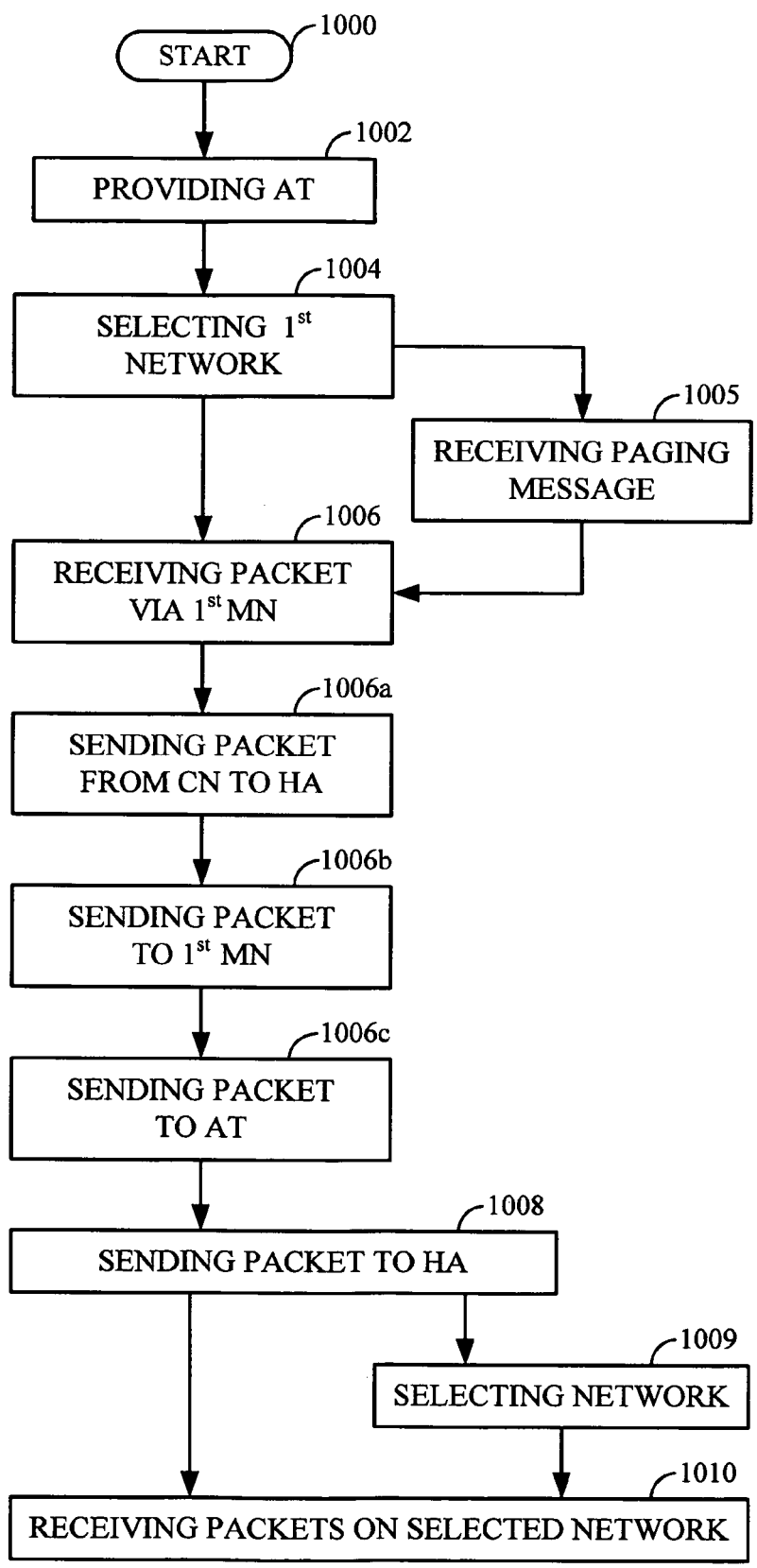

FIG. 10 is a flowchart illustrating a variation in the method for MIP addressing in a multi-mode wireless communications AT. The method starts at Step 1000. Step 1002 provides an AT having an IP address (ATA) and a CoA in each of a plurality of networks. Step 1004 selects a first network from the plurality of networks. Step 1006 receives an IP packet from a CN with the ATA listed as a destination address, via a first MN external device.

In one aspect, Step 1002 creates a tunnel between the HA and the first MN, and receiving an IP packet from the CN in Step 1006 includes substeps. Step 1006a sends the IP packet from the CN to the HA. Step 1006b sends the IP packet to the first MN with a first CoA listed as a tunnel destination address. Step 1006c sends the IP packet from the first MN to the AT, with the ATA listed as the destination address.

In one aspect, selecting the first network in Step 1004 includes selecting the first network from a source such as the AT, the HA, the MN, and a combination of the AT, HA and MN. If the HA selects the first network, it may use packet filter criteria such as source address, destination address, source port, destination port, type of service, protocol type, packet size, traffic class, or flow label, to name a few examples.

In a different aspect, Step 1004 selects the first network and a second network. A further step, Step 1005, receives a paging message via a second MN associated with a second network, prior to receiving the IP packet. Then, receiving the IP packet in Step 1006 includes accessing the first network in response to receiving the paging message, and receiving the IP packet via the first network.

In one aspect, Step 1004 selects the first network and the second network, and receiving the IP packet from the CN in Step 1006 includes receiving IP packets via a second MN associated with the second network, in addition to receiving IP packets via the first MN associated with the first network. In a different aspect Step 1008 sends an IP packet to an HA via the first network. Then, in Step 1010 the HA ceases to forward IP packets on a second network, in response to the AT sending the IP packet via the first network in Step 1008. Alternately, the AT may send a redirect message to the HA in Step 1008, and in Step 1010 the HA ceases to forward IP packets on a second network in response to sending the redirect message. That is, packets are received only via the selected first network.

In another aspect, Step 1008 sends an IP packet to an HA via the second MN associated with a second network. Step 1009 selects the second network in response to the AT sending the IP packet, and Step 1010 subsequently receives IP packets via the second MN.

A system and method have been described for using MIP addressing in a wireless communications AT. Some examples of specific protocols, network types, and signaling have been provided to illustrate the invention. However, the invention is not limited to merely these examples. Other variations and embodiment of the invention will occur to those skilled in the art.

What is claimed is:

1. In a multi-mode wireless communications access terminal (AT), a method for mobile Internet Protocol (IP) addressing, the method comprising:
   providing, by an addressing module, an AT with an IP address (ATA) and a care-of-address (CoA) in each of a plurality of networks;
   selecting a first network for transmission from the plurality of networks; and
   sending an IP packet to a correspondent node (CN) via a first mobile node (MN) external device, using the ATA as a source address, wherein the first MN external device has a first CoA and a tunnel with a Home Agent (HA), wherein the IP packet is configured to have the first CoA as a tunnel source address when sent to the HA and to have the ATA as the source address when sent from the HA to the CN.

2. The method of claim 1 further comprising:
   selecting a second network for transmission; and,
   sending an IP packet to the CN via a second MN external device using the ATA as the source address.

3. The method of claim 1, further comprising:
   selecting a second network for transmission, in addition to the first network; and,
   sending IP packets to the CN via the first MN with a first CoA, and via a second MN with a second CoA, using the ATA as the source address.

4. The method of claim 1, further comprising:
   registering the CoAs with the HA, from a source comprising the AT.

5. The method of claim 1, wherein the AT comprises a plurality of communication subsystems having wireless transceivers for communicating across respective network interfaces with a plurality of mobile units (MNs) external device in a corresponding plurality of networks, wherein the providing further comprises creating a location-dependent CoA corresponding to each MN for each network interface used by the AT.

6. The method of claim 1, wherein the selecting further comprises additionally selecting a second network for transmission from the plurality of networks, wherein the sending further comprises sending a plurality of IP packets to a correspondent node (CN) via the first MN and via a second MN, using the ATA as the source address, wherein the second MN has a second CoA and a second tunnel with the HA, wherein a first portion of the plurality of IP packets sent via the first MN are configured to have the first CoA as the tunnel source address when sent to the HA and to have the ATA as the source address when sent from the HA to the CN, and wherein a second portion of the plurality of IP packets sent via the second MN are configured to have the second CoA as the tunnel source address when sent to the HA and to have the ATA as the source address when sent from the HA to the CN.

7. A multi-mode wireless communications access terminal (AT) system for sending Internet Protocol (IP) packets using mobile IP (MIP) addressing, the system comprising:
   a first external device mobile unit (MN) having a first network interface for receiving an IP packet from a first communication subsystem of an AT with an AT IP Address (ATA) listed as the source address and destined for a correspondent node (CN), wherein the first MN comprises a tunnel interface for sending the IP packet using a first care-of-address (CoA) as the tunnel source address, wherein the first care-of-address (CoA) comprises one of a plurality of CoAs for a plurality of MNs cross-referenced by the AT to the ATA; and
   a home agent (HA) comprising a tunnel interface for receiving the IP packet from the first MN, and a network interface for sending the IP packet to the CN with the ATA listed as the source address.

8. The system of claim 7, further comprising a second MN having a second network interface for receiving an IP packet from a second communication subsystem of the AT and destined for the CN, the IP packet using the ATA as the source address.

9. The system of claim 7, wherein the CoAs are registered with the HA, from a source selected from the group consisting of the AT, the MN, and a combination of the AT and the MN.

10. The system of claim 7, wherein the HA further comprises a plurality of filter sets for the AT, wherein each filter set corresponds to a respective MN, and wherein each filter set defines a different packet forwarding policy for the AT with respect to the respective MN.

11. The system of claim 7, further comprising:
   wherein the first network interface of the first MN is for receiving a first portion of a plurality, of IP packets from the, first communication subsystem of the AT, wherein the first tunnel interface is for sending the first portion of the plurality of IP packets using the first CoA as the tunnel source address, wherein the first CoA comprises the one of the plurality of CoAs corresponding to the first MN;
   a second MN having a second network interface for receiving a second portion of the plurality of IP packets from a second communication subsystem of the AT with the ATA listed as the source address and destined for the CN, wherein the second MN comprises a second tunnel interface for sending the second portion of the plurality of IP packets using a second CoA as the tunnel source address, wherein the second CoA comprises a second one of the plurality of CoAs corresponding to the second MN; and
   wherein the HA further comprises a second tunnel interface for receiving the second portion of the plurality of IP packets from the second MN.

12. A multi-mode wireless communications access terminal (AT) processing device for sending Internet Protocol (IP) packets using mobile IP (MIP) addressing, the processing device comprising:
  interfaces for a plurality of communication subsystems wirelessly communicating with a plurality of external device mobile units (MNs) in a corresponding plurality of networks;
  a memory for storing an AT IP address (ATA) cross-referenced to a care-of-address (CoA) for each of the plurality of MNs; and
  a network address selector for sending an IP packet to a correspondent node (CN) using the ATA as the source address, via a first MN with a first CoA from the plurality of CoAs and a tunnel with a Home Agent (HA), wherein the IP packet is configured to have the first CoA as a tunnel source address when sent to the HA and to have the ATA as the source address when sent from the HA to the CN.

13. The processing device of claim 12 wherein the network address selector receives an IP packet from the CN with the ATA listed as the destination address, via the first MN.

14. The processing device of claim 12, further comprising an addressing module configured to create a location-dependent CoA corresponding to each MN for each network interface, used by the AT.

15. The processing device of claim 12, wherein the network address selector is further configured to send a plurality of IP packets to a correspondent node (CN) via the first MN and via a second MN, using the ATA as the source address, wherein the second MN has a second CoA and a second tunnel with the HA, wherein a first portion of the plurality of IP packets sent via the first MTN are configured to have the first CoA as the tunnel source address when sent to the HA and to have the ATA as the source address when sent from the HA to the CN, and wherein a second portion of the plurality of IP packets sent via the second MN are configured to have the second CoA as the tunnel source address when sent to the HA and to have the ATA as the source address when sent from the HA to the CN.

16. A multi-mode wireless communications access terminal (AT) with means for sending Internet Protocol (IP) packets using mobile IP (MIP) addressing, the AT comprising:
  means for wirelessly communicating with a plurality of external device mobile units (MNs) in a plurality of networks; and
  means for network selection, having an AT IP address (ATA) cross-referenced to a care-of-address (CoA) for each of the plurality of MNs, the network selection means selecting a first network for transmission and sending an IP packet to a correspondent node (CN) using the ATA as the source address, via a first MN having a first CoA and a tunnel with a Home Agent (HA), wherein the IP packet is configured to have the first CoA as a tunnel source address when sent to the HA and to have the ATA as the source address when sent from the HA to the CN.

17. The AT of claim 16, further comprising a means for addressing configured to create a location-dependent CoA corresponding to each MN for each network interface used by the AT.

18. The AT of claim 16, wherein the means for network selection is further configured to send a plurality of IP packets to a correspondent node (CN) via the first MN and via a second MN, using the ATA as. the source address, wherein the second MN has a second CoA and a second tunnel with the HA, wherein a first portion of the plurality of IP packets sent via the first MN are configured to have the first CoA as the tunnel source address when sent to the HA and to have the ATA as the source address when sent from the HA to the CN, and wherein a second portion of the plurality of IP packets sent via the second MN are configured to have the second CoA as the tunnel source address when sent to the HA and to have the ATA as the source address when sent from the HA to the CN.

19. The AT of claim 16 wherein the network selection means receives an IP packet from the CN with the ATA listed as the destination address, via the first MN.

20. In a multi-mode wireless communications access terminal (AT), a signal bearing medium tangibly embodying a program of machine-readable instructions executable by a digital processing apparatus to perform operations for mobile Internet Protocol (IP) addressing, the operations comprising:
  providing, by an addressing module, an AT with an IP address (ATA) and a care-of-address (CoA) in each of a plurality of networks;
  selecting a first network for transmission from the plurality of networks; and
  sending an IP packet to a correspondent node (CN) via a first mobile node (MN) external device, using the ATA as a source address, wherein the first MN external device has a first CoA and a tunnel with a Home Agent (HA), wherein the IP packet is configured to have the first CoA as a tunnel source address when sent to the HA and to have the ATA as the source address when sent from the HA to the CN.

21. The program of claim 20, wherein the AT comprises a plurality of communication subsystems having wireless transceivers for communicating across respective network interfaces with a plurality of mobile units (MNs) external device in a corresponding plurality of networks, wherein the operation of providing further comprises creating a location-dependent CoA corresponding to each MN for each network interface used by the AT.

22. The program of claim 20, wherein the operation of selecting further comprises additionally selecting a second network for transmission from the plurality of networks, wherein the sending further comprises sending a plurality of IP packets to a correspondent node (CN) via the first MN and via a second MN, using the ATA as the source address, wherein the second MN has a second CoA and a second tunnel with the HA, wherein a first portion of the plurality of IP packets sent via the first MN are configured to have the first CoA as the tunnel source address when sent to the HA and to have the ATA as the source address when sent from the HA to the CN, and wherein a second portion of the plurality of IP packets sent via the second MN are configured to have the second CoA as the tunnel source address when sent to the HA and to have the ATA as the source address when sent from the HA to the CN.

23. A multi-mode wireless communications access terminal (AT) system for sending Internet Protocol (IP) packets using mobile IP (MIP) addressing, the system comprising:
  first means for receiving, via a first network interface, an IP packet from a first communication subsystem of an AT with an AT IP Address (ATA) listed as the source address and destined for a correspondent node (CN);
  first means for sending, via a first tunnel interface, the IP packet using a first care-of-address (CoA) as the tunnel source address, wherein the first care-of-address (CoA) comprises one of a plurality of CoAs for a plurality of means for receiving cross-referenced by the AT to the ATA;

second means for receiving, via the tunnel interface, the IP packet from the first means for sending; and second means for sending the IP packet to the CN with the ATA listed as the source address.

24. The system of claim 23, further comprising a third means for receiving, via a second network interface, an IP packet from a second communication subsystem of the AT and destined for the CN, the IP packet using the ATA as the source address.

25. The system of claim 23, wherein the CoAs are registered with the second means for receiving, from a source selected from the group consisting of the AT, the first means for sending, and a combination of the AT and the first means for sending.

26. The system of claim 23, wherein the second means for receiving further comprises a plurality of filter sets for the AT, wherein each filter set corresponds to a respective first means for sending, and wherein each filter set defines a different packet forwarding policy for the AT with respect to the respective first means for sending.

27. The system of claim 23, further comprising:
wherein the first network interface is for receiving a first portion of a plurality of IP packets from the first communication subsystem of the AT, wherein the first tunnel interface is for sending the first portion of the plurality of IP packets using the first CoA as the tunnel source address, wherein the first CoA comprises the one of the plurality of CoAs corresponding to the first means for sending;
a third means for receiving having a second network interface for receiving a second portion of the plurality of IP packets from a second communication subsystem of the AT with the ATA listed as the source address and destined for the CN; and
a third means for sending, via a second tunnel interface, the second portion of the plurality of IP packets using a second CoA as the tunnel source address, wherein the second CoA comprises a second one of the plurality of CoAs corresponding to the third means for sending; and
wherein the second means for receiving further receives the second portion of the plurality of IP packets from the third means for sending.

28. A multi-mode wireless communications access terminal (AT) system for sending Internet Protocol (IP) packets using mobile IP (MIP) addressing, a method comprising:
receiving by a first external device mobile unit (MN), via a first network interface, an IP packet from a first communication subsystem of an AT with an AT IP Address (ATA) listed as the source address and destined for a correspondent node (CN);
sending by the first MN, via a first tunnel interface, the IP packet using a first care-of-address (CoA) as the tunnel source address, wherein the first care-of-address (CoA) comprises one of a plurality of CoAs for a plurality of means for receiving cross-referenced by the AT to the ATA;
receiving at a home agent (HA), via the tunnel interface, the IP packet from the first means for sending; and
sending the IP packet from the HA to the CN with the ATA listed as the source address.

29. The method of claim 28, further comprising receiving by a second MN, via a second network interface, an IP packet from a second communication subsystem of the AT and destined for the CN, the IP packet using the ATA as the source address.

30. The method of claim 28, wherein the CoAs are registered with the HA from a source selected from the group consisting of the AT, the first MN, and a combination of the AT and the first MN.

31. The method of claim 28, wherein the HA further comprises a plurality of filter sets for the AT, wherein each filter set corresponds to a respective MN, and wherein each filter set defines a different packet forwarding policy for the AT with respect to the respective MN.

32. The method of claim 28, further comprising:
wherein the receiving, by the first MN, further comprises receiving a first portion of a plurality of IP packets from the first communication subsystem of the AT, wherein the first tunnel interface is for sending the first portion of the plurality of IP packets using the first CoA as the tunnel source address, wherein the first CoA comprises the one of the plurality of CoAs corresponding to the first MN;
receiving, by a second MN having a second network interface, a second portion of the plurality of IP packets from a second communication subsystem of the AT with the ATA listed as the source address and destined for the CN; and
sending, by the second MN via a second tunnel interface, the second portion of the plurality of IP packets using a second CoA as the tunnel source address, wherein the second CoA comprises a second one of the plurality of CoAs corresponding to the second MN; and
wherein the HA further receives the second portion of the plurality of IP packets from the second MN.

33. In a multi-mode wireless communications access terminal (AT) system, a signal bearing medium tangibly embodying a program of machine-readable instructions executable by a digital processing apparatus to perform operations for mobile Internet Protocol (IP) addressing, the operations comprising:
receiving by a first external device mobile unit (MN), via a first network interface, an IP packet from a first communication subsystem of an AT with an AT IP Address (ATA) listed as the source address and destined for a correspondent node (CN);
sending by the first MN, via a first tunnel interface, the IP packet using a first care-of-address (CoA) as the tunnel source address, wherein the first care-of-address (CoA) comprises one of a plurality of CoAs for a plurality of means for receiving cross-referenced by the AT to the ATA;
receiving at a home agent (HA), via the tunnel interface, the IP packet from the first means for sending; and
sending the IP packet from the HA to the CN with the ATA listed as the source address.

34. The program of claim 33, wherein the operations further comprise receiving by a second MN, via a second network interface, an IP packet from a second communication subsystem of the AT and destined for the CN, the IP packet using the ATA as the source address.

35. The program of claim 33, wherein the CoAs are registered with the HA from a source selected from the group consisting of the AT, the first MN, and a combination of the AT and the first MN.

36. The program of claim 33, wherein the operations further apply a plurality of filter sets for the AT at the HA, wherein each filter set corresponds to a respective MN, and wherein each filter set defines a different packet forwarding policy for the AT with respect to the respective MN.

37. The program of claim 33, wherein the receiving operations, by the first MN, further comprise receiving a first portion of a plurality of IP packets from the first communication subsystem of the AT, wherein the first tunnel interface is for sending the first portion of the plurality of IP packets using the first CoA as the tunnel source address, wherein the first CoA comprises the one of the plurality of CoAs corresponding to the first MN, and wherein the operations further comprise:

receiving, by a second MN having a second network interface, a second portion of the plurality of IP packets from a second communication subsystem of the AT with the ATA listed as the source address and destined for the CN; and sending, by the second MN via a second tunnel interface, the second portion of the plurality of IP packets using a second CoA as the tunnel source address, wherein the second CoA comprises a second one of the plurality of CoAs corresponding to the second MN; and wherein the receiving by the HA further includes receiving the second portion of the. plurality of IP packets from the second MN.

\* \* \* \* \*

UNITED STATES PATENT AND TRADEMARK OFFICE
CERTIFICATE OF CORRECTION

| | |
|---|---|
| PATENT NO. | : 7,633,898 B2 |
| APPLICATION NO. | : 11/347506 |
| DATED | : December 15, 2009 |
| INVENTOR(S) | : Jain et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Twenty-first Day of December, 2010

David J. Kappos
*Director of the United States Patent and Trademark Office*